United States Patent
Tsai et al.

(10) Patent No.: US 12,529,649 B2
(45) Date of Patent: Jan. 20, 2026

(54) IMAGE ACQUISITION SYSTEM FOR ACQUIRING AN IMAGE OF A LIQUID SAMPLE

(71) Applicant: CYTENA BIOPROCESS SOLUTIONS CO., LTD, Taipei (TW)

(72) Inventors: Cheng-Han Tsai, Taipei (TW); Da-Han Kuan, Taipei (TW); Yeu-Farn Shih, Taipei (TW); Joy Doong, Taipei (TW)

(73) Assignee: CYTENA BIOPROCESS SOLUTIONS CO., LTD, Taipei (TW)

( * ) Notice: Subject to any disclaimer, the term of this patent is extended or adjusted under 35 U.S.C. 154(b) by 107 days.

(21) Appl. No.: 18/681,372

(22) PCT Filed: Jul. 30, 2022

(86) PCT No.: PCT/EP2022/071488
§ 371 (c)(1),
(2) Date: Feb. 5, 2024

(87) PCT Pub. No.: WO2023/016834
PCT Pub. Date: Feb. 16, 2023

(65) Prior Publication Data
US 2024/0310274 A1    Sep. 19, 2024

(30) Foreign Application Priority Data
Aug. 8, 2021   (LU) ......................................... 500518

(51) Int. Cl.
*G01N 21/03*   (2006.01)
(52) U.S. Cl.
CPC ..... *G01N 21/0303* (2013.01); *G01N 21/0332* (2013.01); *G01N 2021/0307* (2013.01)
(58) Field of Classification Search
CPC ........... G01N 21/0303; G01N 21/0332; G01N 2021/0307; G01N 21/253
(Continued)

(56) References Cited

U.S. PATENT DOCUMENTS

| | | | |
|---|---|---|---|
| 2005/0239197 A1 | 10/2005 | Katerkamp et al. | |
| 2012/0242993 A1* | 9/2012 | Schick | G01N 21/0303 356/442 |
| 2013/0176556 A1 | 7/2013 | Larkin et al. | |

FOREIGN PATENT DOCUMENTS

| | | |
|---|---|---|
| EP | 3556844 A1 | 10/2019 |
| WO | WO2020047397 A1 | 3/2020 |

OTHER PUBLICATIONS

Search Report and Written Opinion (With Cover Letter) for LU500518, provided by the Luxembourg Intellectual Property Office, dated Jan. 27, 2022.

(Continued)

*Primary Examiner* — Md M Rahman
(74) *Attorney, Agent, or Firm* — Hodgson Russ LLP (57) ABSTRACT

The invention relates to an image acquisition system (1) for acquiring an image of a liquid sample (2), comprising a well (3) that stores liquid sample (2), an image acquisition device (4) for acquiring an image of the liquid sample (2) in the well (3), a lid device (5) for covering the well (3) wherein the lid device (5) comprises a lid (6) having a lid part (7) and a lid extension (8) that extends from the lid part (7) into the well (3). The image acquisition system is characterized in that at least one part of the lid extension (8) is in physical contact with the liquid sample (2) when an image is acquired by means of the image acquisition device (4) and a light beam passes through the part of the lid extension (8) that is in physical contact with the liquid sample (2) before it is received by the image acquisition device (4).

20 Claims, 10 Drawing Sheets

(58) Field of Classification Search
USPC .......................................................... 356/246
See application file for complete search history.

(56) References Cited

OTHER PUBLICATIONS

International Search Report and Written Opinion of the International Searching Authority (ISA) for PCT Application PCT/EP2022/071488, provided by the European Patent Office, dated Nov. 3, 2022.

* cited by examiner

IMAGE ACQUISITION SYSTEM FOR ACQUIRING AN IMAGE OF A LIQUID SAMPLE

The invention relates to an image acquisition system for acquiring an image of a liquid sample, comprising a well that stores liquid sample, an image acquisition device for acquiring an image of the liquid sample in the well, a lid device for covering the well wherein the lid device comprises a lid having a lid part and a lid extension that extends from the lid part into the well. Additionally, the invention relates to a method for acquiring an image of a liquid sample. The invention also relates to a use of a lid device for covering a well in an image acquisition system for acquiring an image of a liquid sample.

In a pharmaceutical process of biosimilar drugs, a cell line development process is required for most biopharmaceuticals. The cell line development is a method for selecting protein/antibodies, achieving a high yield of the protein/antibodies, and optimizing the quality thereof. However, the cell line development is on the other hand a very complicated, labour-intensive, and pricey process. Development time for most pharmaceutical factories is half a year.

A core tool required in the cell line development is a bioreactor for cell incubation. Starting from incubating single-cells in the process, the scale is continually expanded to a volume production scale through repeated transferring steps of selecting and scaling-up. Therefore, for different phases and different quantities of cells, bioreactors of different sizes ranging from a bioreactor at a microliter level to a large-scale bioreactor at a volume production level are required. However, there is a limitation on optimization of a cell incubating environment of a smaller-sized bioreactor. An ideal bioreactor generally needs to enable cells to continually grow in a suspension, dynamically monitor biosignals, and perform feedback control on dissolved oxygen content and a pH value. It is difficult to achieve the foregoing functions in a microliter-leveled bioreactor.

In the process it is desirable that the cell line development is monitored and/or to acquire images of the liquid sample, in which the cells are arranged. Thereto, it is desired to use an image acquisition device for acquiring images of the cell located in a well. In order to process the acquired images and, thus, to monitor the cell line development it is necessary to acquire sharp images. This is often not possible as light that is received by the image acquisition device passes through media, like among others liquid sample and air, with different optical density wherein the depth of at least one of the media is not known.

For example, if the well is closed with a lid, light has to pass through a well bottom, the liquid sample comprising the cell, and the air portion located between the liquid sample and the lid. However, the volume of the air portion within the receptacle depends among others on the liquid sample volume located in the receptacle and on the amount of vaporized liquid sample. In order to consider the optical density influence of the air portion on the setting of the image acquisition device it is necessary to know the volume of the air portion, in particular, the distance between the lid and the liquid sample in vertical direction. The vertical direction is parallel to a gravity direction. Therefore, it is known to determine the volume of air portion and to consider said volume by setting the image acquisition device. After the volume of air portion is determined, the liquid sample volume is also known.

However, determination of the air portion is cumbersome and is sometimes difficult because the air portion volume can change during the cell line development due to vaporization of the liquid sample in the well.

Therefore, the object of the invention is to provide an image acquisition system by means of which the influence of the air portion volume on the image quality is at least reduced.

The objective is solved by an image acquisition system for acquiring an image of a liquid sample, comprising
  a well that stores liquid sample,
  an image acquisition device for acquiring an image of the liquid sample in the well,
  a lid device for covering the well wherein the lid device comprises a lid having a lid part and a lid extension that extends from the lid part into the well, characterized in that
  at least one part of the lid extension is in physical contact with the liquid sample when an image is acquired by means of the image acquisition device and the part of the lid extension that is in physical contact with the liquid sample is arranged such that light, in particular a light beam, passes through the part of the lid extension before it is received by the image acquisition device.

Another object of the invention is to provide a method for acquiring an image in which the influence of the air portion volume on the image quality is at least reduced.

The objective is solved by a method for acquiring an image of a liquid sample, the method comprising the following steps:
  placing a lid device on a well storing liquid sample,
  acquiring an image of the liquid sample when at least one part of the lid extension is in physical contact with the liquid sample wherein the part of the lid extension that is in physical contact with the liquid sample is arranged such that light, in particular a light beam, passes through the part of the lid extension that is in physical contact with the liquid sample before it is received by an image acquisition device.

The invention comprises the advantage that the lid extension is in physical contact with the liquid sample. Thus, the optical density of an air portion that is arranged between the liquid device and the liquid sample when the image is not acquired does not have any influence on the image acquisition. Thus, the optical density of the air portion has not to be considered for setting the image acquisition device. Another advantage of the invention is that vaporizing of the liquid sample and thus, a change of the air volume portion, does also not have any influence on the image acquisition.

The liquid sample depends on the usage field of the processing device. If the processing device is used in a bioreactor, the liquid sample comprises a biological particle. The biological particle can be a cell or a microbe. The liquid sample can contain a liquid and at least one biological particle. The liquid can promote the growth of the biological particles, in particular cells or microbes, arranged in the liquid. If the processing device is used in a chemical reactor, the liquid sample can comprise one or more chemical reagents.

A well is a receptacle for receiving the liquid sample. The well can be part of a well carrier having a plurality of wells. The well carrier is often indicated as microtiter plate or multiwell plate.

The image acquisition system can comprise a camera for acquiring the image. Additionally, the image acquisition system can comprise an evaluation device for evaluating the acquired images. The evaluation device can be a processor or can comprise a processor.

According to an embodiment the image acquisition system comprises an illumination device, in particular a light source, for providing the light beam. The illumination device improves the image quality of the images acquired by the image acquisition system.

The image acquisition device and the illumination device can be arranged opposite to each other. In particular, the image acquisition device and the illumination device can be arranged opposite to each other with respect to the well, in particular with respect to a plane being perpendicular to a central axis of the well. The image acquisition device can be arranged above the well and the illumination device can be arranged below the well. Alternatively, the illumination device can be arranged above the well and the image acquisition device can be arranged below the well. The arrangement above or below the well refer to the central axis of the well in a state when liquid sample is arranged in the well and/or refer to the direction of the gravity field.

In an alternative embodiment the image acquisition device and the illumination device can be arranged at the same side of the image acquisition system. This means, both the image acquisition device and the illumination device can be arranged above or below the well.

The image acquisition device can be arranged in a predetermined distance from a well bottom and/or from the part of the lid extension that is in physical contact with the liquid sample. Such arrangement enables that images in good quality can be acquired and the configuration of the image acquisition device is simplified. In particular, it is not necessary anymore to determine the volume of the air portion as it is done in the known embodiments. This is possible as the length of the light path through the different portions, in particular media, of the image acquisition system having different optical density is known. The distance refers to a distance along the central axis of the well.

According to an embodiment the lid part and the lid extension can be formed in one piece. The lid extension can be formed by deep drawing the lid, in particular the lid part. Thus, the lid extension can be created in a simple manner. The lid extension extends in a direction towards the well from the lid part. The lid device is used to cover the well when the lid device is placed on the well. In particular, the lid device fully covers an insertion opening of the well through which liquid sample is inserted into the well.

The part of the lid extension can be a bottom part of the lid extension. A bottom part of the lid extension is the part of the lid extension that is arranged closest to the well bottom. In particular, the bottom part is arranged closer to a well bottom than the remaining parts of the lid. The bottom part can form a closed end of the lid extension. That means, the bottom part does not comprise any holes through which the liquid sample can pass through the lid extension. The bottom part can be transparent and/or light transmissive. Thus, the light beam illuminated from the illumination device can easily pass through the bottom part. Such an embodiment is preferable when the image acquisition device and the illumination device are arranged opposite to each other. Alternatively, the bottom part can comprise a mirror to reflect light back. Such an embodiment is preferable when the image acquisition device and the illumination device are arranged on the same side of the image acquisition system. The lid device, that means, the lid part and the remaining part of the lid extension can be transparent and/or light transmissive.

The bottom part and the remaining lid extension can be formed in one piece. In an alternative embodiment the bottom part and the lid extension can be formed in two pieces wherein the lid extension can be attached to the bottom part in a releasable manner. The connection between the lid extension and the bottom part can be a form-fit or force fit connection. Thus, it is easy possible to exchange the lid extension so that the height of the lid extension can be set to the height that is needed in the specific application.

According to an embodiment the image acquisition system can comprise a plurality of lid devices wherein the lid devices differ in the length of the lid extension from each other. As "length" the distance between the lid part and the bottom part of the lid extension in vertical direction is meant. Thus, the user can choose the lid device that has a lid extension with such a length so that the lid extension is in physical contact when the lid device is placed on the well. Therefore, it can be secured in an easy manner that the lid extension is in physical contact with the liquid sample after the lid device is placed on the well.

The lid device can comprise a plurality of lid extensions. The plurality of lid extensions can extend from the, in particular same, lid part. The number of lid extensions can correspond with the number of wells. In particular, a lid extension is assigned to a well. Thus, it is secured that at least one, in particular one, lid extension protrudes in each of the wells. As discussed before, such a lid device is suitable if the image acquisition device has a well carrier with a plurality of wells.

The image acquisition can be configured such that the image acquisition device acquires one or more images of one well. After acquiring the image or images the well carrier and/or the optical image acquiring device and the illumination device can be moved to a position in which one or more images of another well are acquired.

The image acquisition system can comprise a movement, in particular rotating, device for moving, in particular rotating, the well. Such a movement device enables that the liquid sample is processed, in particular mixed, in an easy manner.

The image acquisition system can comprise a sensor for sensing whether the lid extension, in particular the bottom part, is in physical contact with the liquid sample. The sensor can be arranged on the lid extension, in particular on the bottom part. Thus, it can be determined in an easy manner whether the lid extension is in physical contact with the liquid sample. Said information can be used for acquiring the image as is explained below more in detail. The sensor can send a sensor signal, in particular an electrical signal, to a control unit of the image acquisition system when the sensor is in contact with the liquid sample. The control unit can turn on the illumination device. Additionally, the control unit can act on the image acquisition device to take an image. The image can be taken after the illumination device is turned on for illuminating the liquid sample.

According to an embodiment the lid device can comprise a further lid that is connected with the lid so that a space exists between the lid and the further lid. The space is configured to receive at least a part of the liquid sample arranged in the well. As is explained below more in detail, liquid sample can be sucked into the space and dispensed from the space during liquid sample processing. With respect to the central axis of the well and/or the gravity field, in particular the gravity field direction, the lid corresponds with an upper part of the lid device and the further lid corresponds with a lower part. Such a lid device has the advantage that it can be used for image processing as described above and for processing the liquid sample arranged in the well. In particular, it is possible to process the liquid sample by provision of the space into which liquid sample can be sucked in.

A further advantage of the lid device is that the liquid sample can be processed and afterwards at least one image of the liquid sample can be taken. Thus, it is not necessary to remove the lid device from the well after the liquid sample is processed. Thus, the liquid sample can be automatically monitored. In particular the liquid sample can be monitored when the well is arranged in a reactor, in particular a chemical reactor or a bioreactor.

The further lid can comprise an extension tube that extends from a further lid part of the further lid. The extension tube can surround a part of the lid extension, in particular the bottom part. In particular the extension tube surrounds the part of the lid extension in a tangential direction of the lid extension. Additionally, the extension tube can protrude longer to the well, in particular the bottom well, than the lid extension. The extension tube can have an open end. That means, the extension tube has an opening through which the liquid sample can insert into the extension tube, in particular in the space of the extension tube. The extension tube and the further lid part can be formed in one piece.

The lid device can comprise a plurality of extension tubes that extend from the further lid part, respectively. The plurality of extension tubes can extend from the, in particular same, further lid part. The number of extensions tubes can correspond with the number of wells. In particular, an extension tube is assigned to a well. Thus, it is secured that at least one, in particular merely one, extension tube protrudes in each of the wells. As discussed before, such a lid device is suitable if the image acquisition device has a well carrier with a plurality of wells.

According to an embodiment the image acquisition system can comprise a pressure control device. The pressure control device can control the pressure in the space. The pressure control device can be fluidically connected with the well, in particular with liquid sample arranged in the well, by means of the space. Such an image acquisition system enables that the pressure control device can alternately apply positive or negative pressure on the liquid sample in order to process the liquid sample arranged in the well. A negative pressure can be applied such that the liquid sample does not come into contact with the lid extension during processing the liquid sample in the well. Processing of liquid sample can comprise the supply or removal of fluid, in particular gas, into the receptacle and/or mixing of the liquid sample being in the receptacle and/or moving of the liquid sample and/or agitation of biological particles of the liquid sample. Moving of the liquid sample can be performed in order to apply shear stress to e.g. cells by means of the moved liquid. Mixing of the liquid sample is understood as a process in which the components of the liquid sample, in particular the biological particles, are moved relative to each other in such a way that a new arrangement pattern is created. The lid device can be used for performing at least one of the aforementioned processing steps. The liquid processing can additionally or alternatively comprise a filtration of the liquid sample by means of a filter of the lid device.

The image acquisition system can comprise a control unit. The control unit can ensure that a negative pressure is applied in the space before an image is acquired. By applying negative pressure, it is achieved that the liquid sample raises in the extension tube and comes in physical contact with the lid extension. Thus, the control unit can set the height of the liquid sample in the extension tube by applying the corresponding negative pressure in the space. In particular, the control unit can determine a negative pressure that is needed so that the liquid sample comes into contact with the lid extensions, in particular, the bottom part of the lid extension, and acts on the pressure control device to apply said negative pressure in the space. Said procedure has the advantage that a liquid droplet condensed on the lid extension is picked up by the liquid sample that comes into contact with the lid extension. That means, it does not have to be waited that the liquid droplet falls into the liquid sample due to gravity force. The negative pressure is applied in the space before the image is acquired.

The control unit can be configured to check whether at least one part of the lid extension is in physical contact with liquid sample, in particular before an image is acquired by means of the image acquisition device. In particular, the control unit can check whether the sensor measures that the part of the lid extension is in physical contact with liquid sample. If the sensor determines that at least one part of the lid extension is in physical contact with the liquid sample, the control unit acts on the image acquisition device to acquire an image of the liquid sample.

The control unit can be configured to act on the image acquisition device to acquire an image after or during a movement, in particular rotating, device moves, in particular rotates, the well. Alternatively or additionally, the control unit can be configured to act on the pressure control device for processing liquid sample in the well. In particular, the control unit can be configured to act on the image acquisition device to acquire an image after the processing of the liquid sample is finished or during the processing of the liquid sample.

According to an embodiment of the image acquisition device can comprise at least one temperature setting device. In particular, the image acquisition system can comprise a first temperature setting device for heating or cooling the lid part. The first temperature setting device can comprise at least one through hole. Said through hole is positioned such that the lid extension, in particular the bottom part of the lid extension is not covered by the first temperature setting device. Thus, the light illuminated from the illumination device is not blocked by the first setting temperature. Additionally, the bottom part of the lid extension is heated slower than the remaining part of the lid.

The temperature setting device can be any device by means of which the temperature of the lid extension and/or the temperature of the vaporized liquid of the liquid sample can directly or indirectly be controlled. Said device is used to ensure that the temperature of the lid extension differs from the temperature of the vaporized liquid of the liquid sample. The temperature difference between the temperature of the lid extension and the temperature of the vaporized liquid of the liquid sample can be set to a predetermined value by means of the at least one temperature setting device. Alternatively, the temperature difference is not set to a predetermined value.

The image acquisition system can comprise a second temperature setting device for heating or cooling the well. Thus, the second temperature changing device heats or cools the liquid sample and/or the vaporized liquid of the liquid sample. Thus, by means of the second temperature device it can be ensured that the temperature of the vaporized liquid of the liquid sample has a different temperature than the lid extension. The first temperature changing device and the second temperature changing device can be arranged opposite each other with respect to the well. This enables a compact structured processing system.

The well can be, in particular directly, arranged on the second temperature setting device. The well can be formed that it covers the second temperature changing device. The second temperature setting device can be a heating plate. The temperature of the heating plate can be controlled by the control unit. The second temperature setting device can have a through hole so that the image acquisition device can receive the light beam.

The at least one control unit can control the first temperature setting device such that the temperature of the lid part and/or further lid part increases or decreases, in particular by 30 to 60 degree Celsius. The temperature of the further lid part can be changed by the first temperature changing device because the lid part is connected with the further lid part as mentioned above. The connection can be made such that thermal energy can be conducted between the lid part and the further lid part. If the control unit increases the temperature of the lid part, the temperature of the remaining part of the lid part and the further lid part is higher than the temperature of the lid extension. The vaporized liquid of the liquid sample is heated by at least the further lid part, in particular the extension tube, so that the temperature difference between the vaporized liquid of the liquid sample and the lid extension increases. The temperature of the lid extension corresponds to the ambient temperature, in particular at least at the begin of operation when the first temperature setting device and/or the second temperature setting device start to heat the lid part and/or the well. The lid extension surface on which the vaporized liquid is condensed is arranged in the surface surrounded by the extension tube.

The at least one control unit can control the second temperature setting device such that the temperature of vaporized liquid of the liquid sample increases, in particular by 30 to 60 degree Celsius. The lid extension can remain at e.g. the ambient temperature so that the temperature difference between the lid extension and the vaporized liquid sample increases.

According to another aspect of the invention a lid device for covering a well is used in an image acquisition system for acquiring an image of a liquid sample, wherein the lid device comprises a lid having a lid part and a lid extension that extends from the lid part into the well and the lid device comprises a further lid that is connected with the lid such that a space exists between the lid and the further lid, wherein at least one part of the lid extension is in physical contact with the liquid sample when an image is acquired by means of an image acquisition device and the part of the lid extension that is in physical contact with the liquid sample is arranged such that light, in particular a light beam, passes through the part of the lid extension before it is received by the image acquisition device.

In the figures, the subject-matter of the invention is schematically shown, wherein identical or similarly acting elements are usually provided with the same reference signs.

FIG. 5*a-e*: a processing of the liquid sample and an image taking step with the image acquisition system shown in FIG. 1, FIG. 6*a-b*: a processing of the liquid sample and an image taking step with the image acquisition system shown in FIG. 3, FIG. 7*a-b*: a processing and imaging step with the image acquisition system shown in FIG. 2, FIG. 8: a side view of an image acquisition system according to a fifth embodiment.

Figure 1:
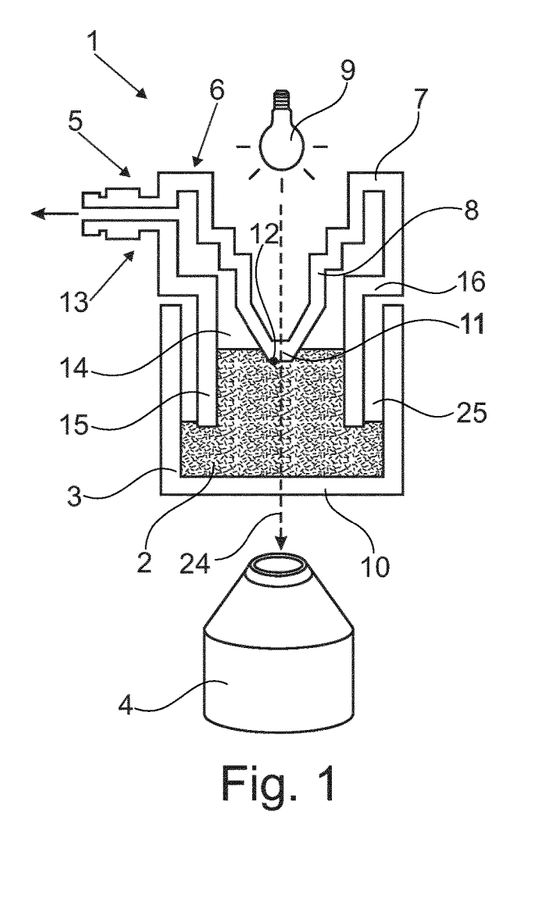
FIG. 1: a side view of an image acquisition system according to a first embodiment.
Figure 8:
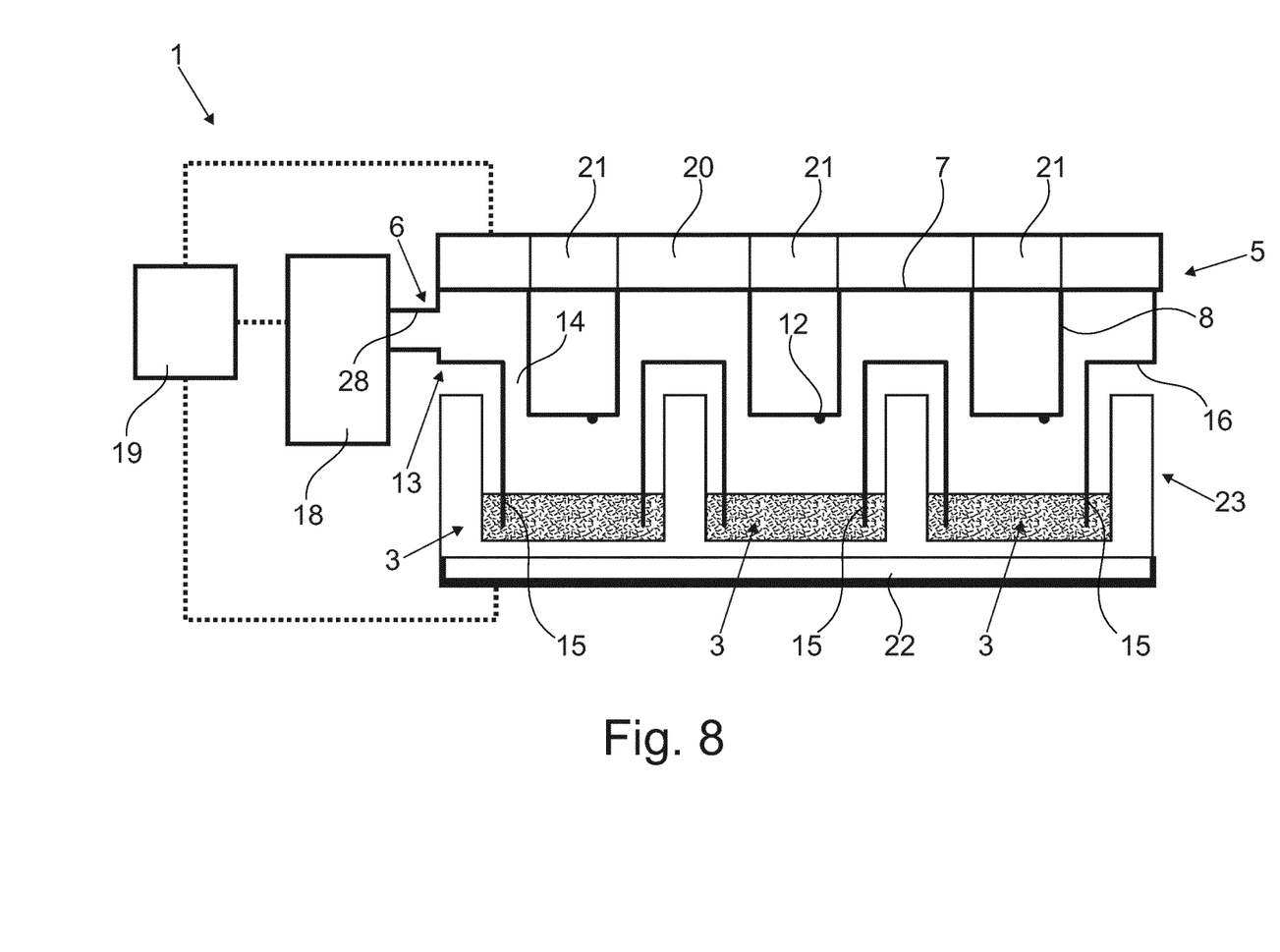

FIG. 1 shows an image acquisition system 1 according to a first embodiment that is used for acquiring an image of a liquid sample 2. The liquid sample 2 is stored in a well 3 of the image acquisition system 1. FIG. 1 shows merely one well 2. However, the image acquisition system 1 can comprise a well carrier 23 that comprises several wells 3 as is shown in FIG. 8. The image acquisition system 1 comprises an image acquisition device 4 for acquiring an image of the liquid sample 2 in the well 3. The image acquisition device can comprise a camera or be a camera. The camera comprises an objective. Additionally, the image acquisition system 1 comprises a lid device 5 for covering the well 3 wherein the lid device 5 comprises a lid 6 having a lid part 7 and a lid extension 8 that extends from the lid part 7 into the well 3. As is shown in FIG. 1 at least one part of the lid extension 8 is in physical contact with the liquid sample 2 when an image is acquired by means of the image acquisition device 4.

The image acquisition system 1 comprises an illumination device 9 for illuminating a light beam 24. The illumination device 9 and the image acquisition device 4 are arranged opposite to each other with respect to the well 3. In the embodiment shown in FIG. 1 the image acquisition device 4 is arranged below the well 3 and the illumination device 9 is arranged above the well 3. However, in another non-shown embodiment the image acquisition device 4 can be arranged above the well 3 and the illumination device 9 can be arranged below the well 3. The terms "above" and "below" refer to a gravitation field.

The part of the lid extension 8 is formed such that a light beam 24 illuminated by the illumination device 9 passes through it before it is received by the image acquisition device 4. That means, the part of the lid extension 8 is arranged between the illumination device 9 and the image acquisition device 4. The part of the lid extension 8 is a bottom part 11 of the lid extension 8. Said bottom part 11 is arranged nearest to a well bottom 10. The lid extension 8 extends into the well 3. That means, the lid extension 8 is arranged in an inner space 25 surrounded by the well 3 in its circumferential direction.

The lid device 5 comprises a further lid 13 that is fixedly connected with the lid 6 wherein the further lid 13 and the lid 6 delimit a space 14 between them. The further lid 13 comprises a further lid part 16 and an extension tube 15 extending from the further lid part 16. The extension tube 15 comprises an open end so that liquid sample can enter into the space 14 when the lid device 5 is arranged on the well 3. In the embodiment shown in FIG. 1 negative pressure is applied on the space 14 so that the liquid sample 2 is suctioned into the space 14 such that liquid sample 2 gets into physical contact with the bottom part 11 of the lid extension 8. The extension tube 14, in particular its opening through which liquid sample 2 enters the space 14, is closer to the well bottom 10 than the bottom part 11 of the lid extension 8. Additionally, the extension tube 15 surrounds at least one part of the lid extension 8, in particular the bottom part 11 in the circumferential direction of the lid extension 8. In other words, a part of the lid extension 8, in particular the bottom part 11, is arranged in the extension tube 14. A sensor 12 is attached to the bottom part 11. The sensor 12 detects if the liquid sample 2 is in contact with the bottom part 11.

Figure 2:
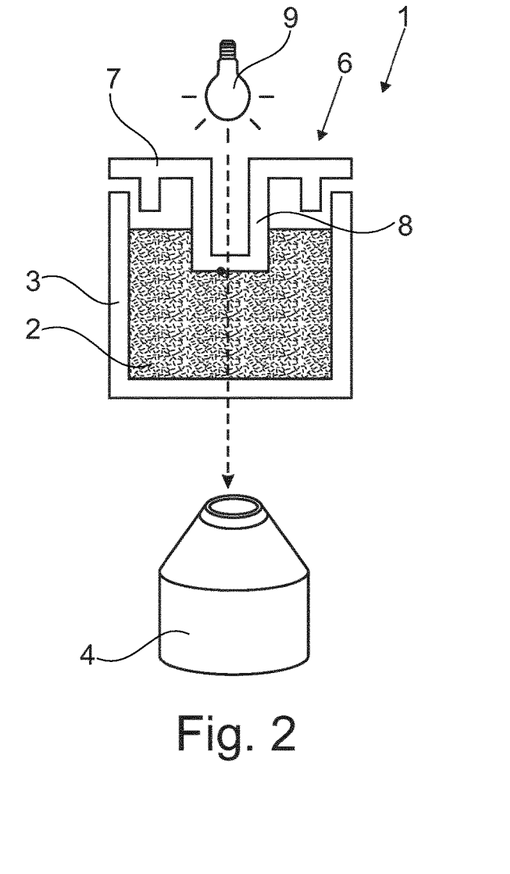
FIG. 2: a side view of an image acquisition system according to a second embodiment.

FIG. 2 shows a side view of an image acquisition system 1 according to a second embodiment. The image acquisition system 1 according to the second embodiment differs from the image acquisition system 1 according to the first embodiment in the structure of the lid device 1. The lid device 5 merely comprises the lid 6 with the lid part 7 and the lid extension 8. That means, the lid device 5 of the image acquisition system 1 according to the second embodiment does not comprise the further lid 13. The lid extension 8 extends from the lid part 7 so that it is in physical contact with the liquid sample 2.

Another difference is that the lid extension 8 has a rectangular shape whereas the lid extension 8 shown in FIG. 1 has a tapered shape.

Figure 3:
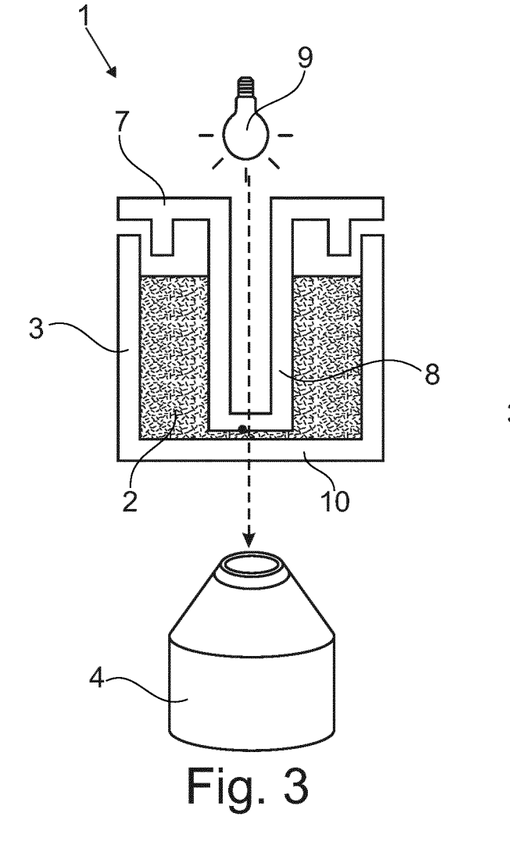
FIG. 3: a side view of an image acquisition system according to a third embodiment.

FIG. 3 shows a side view of an image acquisition system 1 according to a third embodiment. The image acquisition system 1 according to the third embodiment differs from the image acquisition system 1 according to the second embodiment in the length of the lid extension 8. The length of the lid extension 8 of the image acquisition system 1 according to the third embodiment is longer than the length of the lid extension 8 of the image acquisition system 1 according to the second embodiment. This means, the lid extension 8 of the image acquisition system 1 according to the third embodiment extends further in the well 3 than the lid extension 8 of the image acquisition system 1 according to the second embodiment and thus is closer to the well bottom 10 than the lid extension 8 according to the second embodiment.

Figure 4:
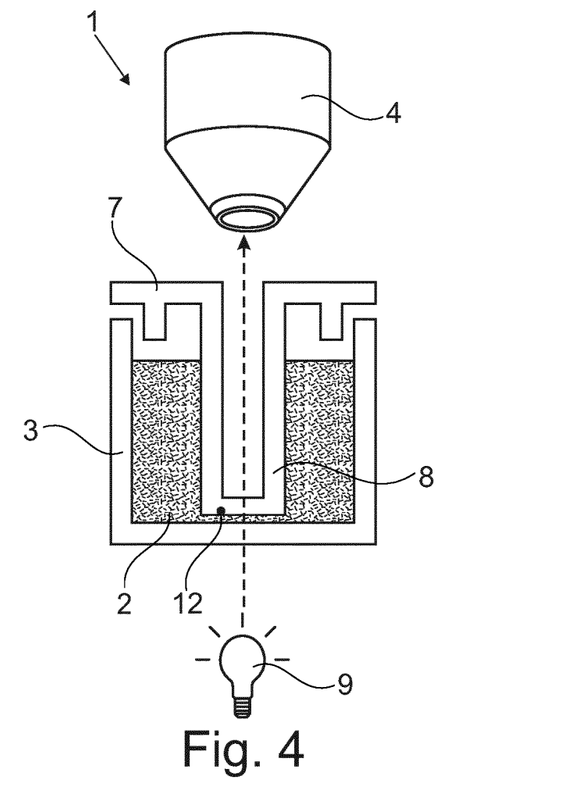
FIG. 4: a side view of an image acquisition system according to a fourth embodiment.

FIG. 4 shows a side view of an image acquisition system 1 according to a fourth embodiment. The image acquisition system 1 according to the fourth embodiment differs from the image acquisition system 1 according to the third embodiment in the arrangement of the illumination device 9 and the image acquisition device 4. In particular, in the embodiment shown in FIG. 4 the illumination device 9 is arranged below the well 3 and the image acquisition device 4 is arranged above the well 3.

Figure 5A:
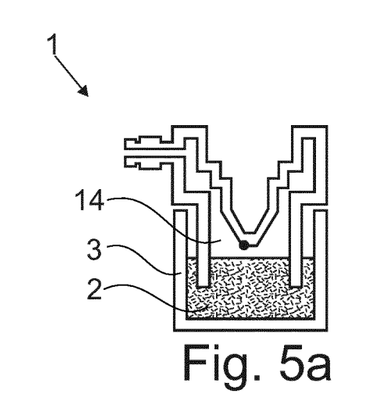
Figure 5B:
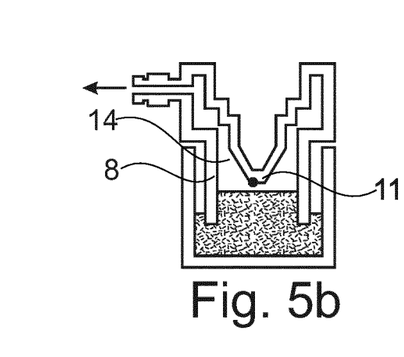

FIG. 5a-e show processing of the liquid sample 2 and an image taking step with the image acquisition system 1 shown in FIG. 1. FIG. 5a shows a state of the image acquisition system 1 in which processing is not started. For starting processing of the liquid sample 2 in the well 3 negative pressure is applied in the space 14 as is shown by the arrow. Due to the negative pressure the liquid sample arranged in the extension tube 15 raises. The negative pressure can be set such that the liquid sample does not come into contact with the bottom part 11. This state is shown in FIG. 5b.

Figure 5C:
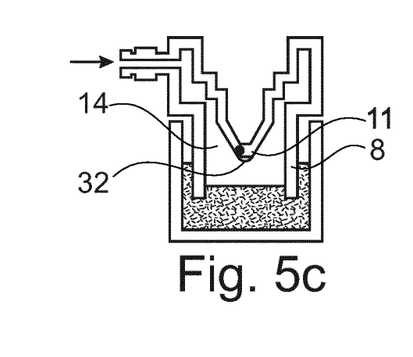

Afterwards, a positive pressure is applied to the space 14. Said pressure leads to that the liquid sample is pushed out of the extension tube 8. This state is shown in FIG. 5c. The aforementioned steps are repeated several times so the liquid sample 2 is processed. Additionally, FIG. 5c shows that a liquid sample drop 32 is arranged on the bottom part 11 of the lid extension. This drop results due to condensing of vaporized liquid sample on the bottom part 11.

Figure 5D:
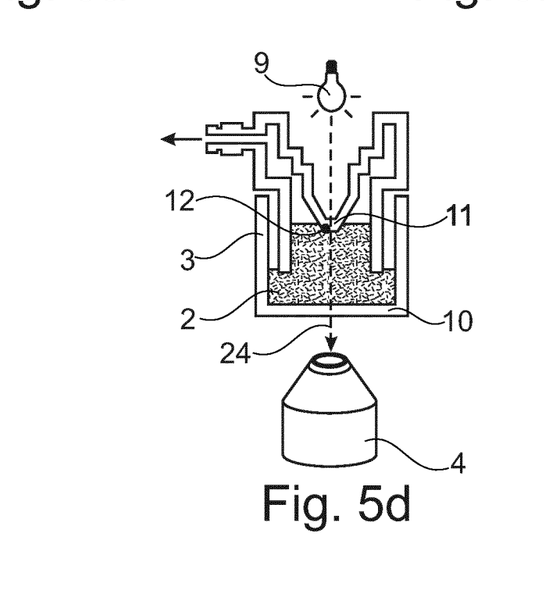

FIG. 5d shows a state of the liquid sample 2 in which at least an image shall be taken by the image acquisition system 1. In said state a negative pressure is applied on the space 14 so that the liquid sample 2 is suctioned in the space 14. The negative pressure is set such that the liquid sample 2 gets into contact with the bottom part 11 of the lid extension 8. The sensor 12 detects that the bottom part 11 is in contact with the liquid sample 2. A control unit receives a sensor signal and acts on the illumination device 9 to illuminate the light beam 24. The light beam 24 passes through an air portion between the illumination device 9 and the bottom part 11, the bottom part 11, the liquid sample 2 and the well bottom 10 before it is received in the image acquisition device 4. The image acquisition device 4 can take one or more images of the liquid sample. In particular, the focal plane of the image acquisition device 4 can be changed so that images in different heights in the well 3 can be acquired.

Figure 5E:
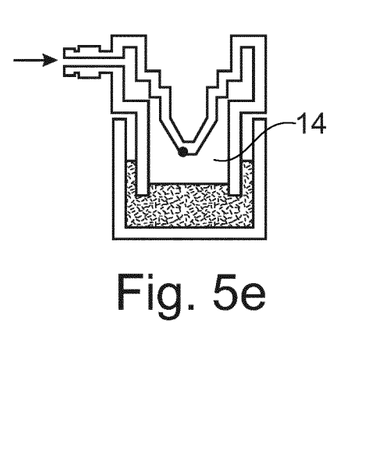

After the image or images are acquired, positive pressure can be applied in the space 14 so that the state as shown in FIG. 5e is achieved. Alternatively, ambient pressure can be applied in the space 14 so that the state as shown in FIG. 5a is achieved.

Figure 6A:
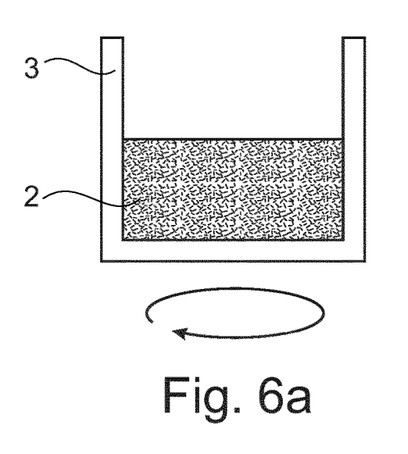
Figure 6B:
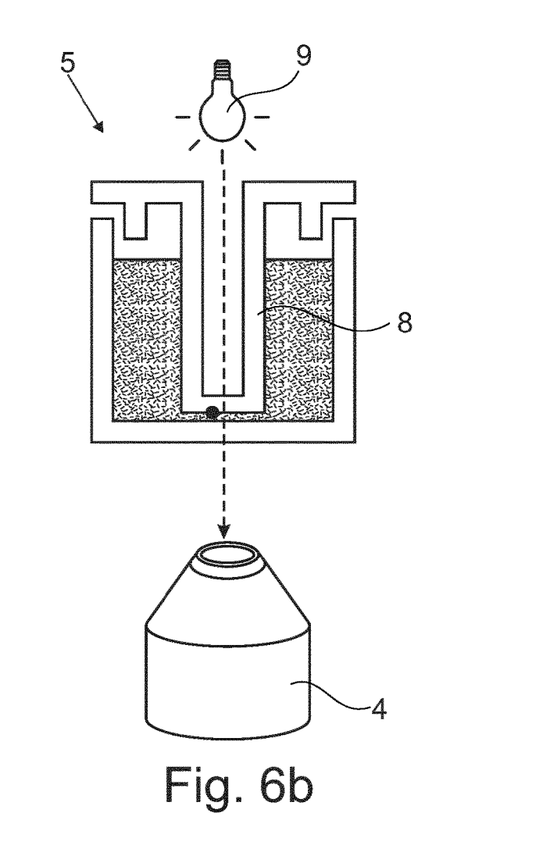

FIG. 6a-b show processing of the liquid sample 2 and an image taking step with the image acquisition system shown in FIG. 3. In FIG. 6a the liquid sample is processed by rotating the well 3. After said processing step the lid device 5 is attached on the well 3 and one or more images are acquired. The well 3 is not rotated when the image is acquired. The image acquiring occurs identical to the image acquiring discussed above in FIG. 5.

Figure 7A:
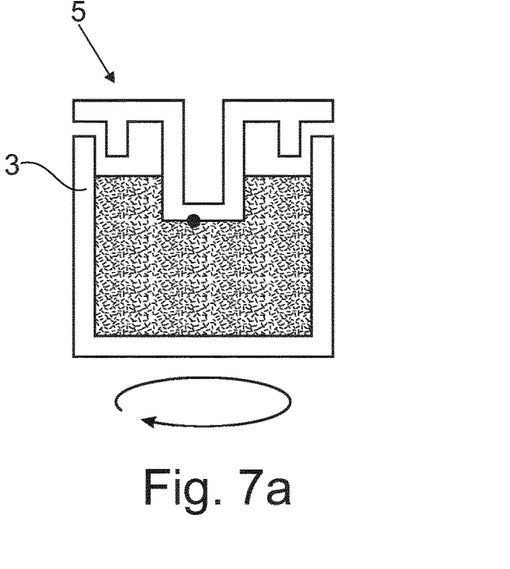
Figure 7B:
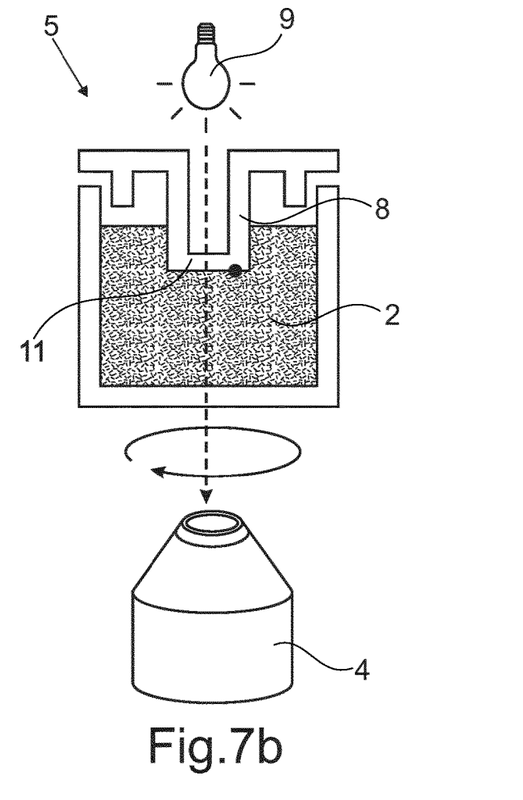

FIG. 7a-b show processing of the liquid sample and an image taking step with the image acquisition system shown in FIG. 2. In difference to the processing shown in FIGS. 6a and 6b the lid device 5 is attached on well 3 when the well 3 is rotated as is shown in FIG. 7a. Additionally, the well 3 is rotated during the image acquiring as is shown in FIG. 7b.

FIG. 8 a side view of an image acquisition system 1 according to a fifth embodiment and a well carrier 23. The well carrier 23 comprises a plurality of wells 3. Each of the wells 3 comprises a liquid sample 2. FIG. 8 does not show the illumination device 9 and the image acquisition device 4.

As is discussed before, the lid device 5 comprises a lid 6 and further lid 13. The further lid part 13 comprises several hollow extension tubes 15 that at partly are arranged in respective wells 3 each of it having a liquid sample 2. The extension tubes 15 extend from further lid part 16 towards the well 3. The lid device 5 also comprises several lid extensions 8 protruding from the lid part 7. The lid extension 8 is partly arranged in the hollow extension tube 15. All lid extensions 8 and extension tubes 15 are identically formed. Additionally, the image acquisition system 1 comprises a first temperature setting device 20 for creating a temperature difference between the temperature of the lid extension 8 and the temperature of a vaporized liquid of the liquid sample 2.

The lid device 5 comprises a connection part 28 that fluidically connects the space 14 with a pressure control device 18 of the image acquisition system 1. The pressure control device 18 is configured to apply a positive or negative pressure. Due to the fluid connection between the space 14 and the pressure control device 18 by means of the connection part 28, the pressure control device 18 applies a positive or negative pressure on the space 14. By applying negative pressure in the space 14 the liquid sample 2 is aspirated into the extension tube 15 and by applying positive pressure in the space 14 the liquid sample 2 arranged in the extension tube 15 is dispensed into the well 3.

The lid device 5 is placed on the well carrier 23. As mentioned before, the well carrier 23 comprises a plurality of wells 3 wherein the number of wells 3 corresponds to the number of extension tubes 15. The lid extension 8 and the lid part are a one-piece part. The lid extension 8 has a rectangular shape wherein only a part of the lid extension 8 is arranged in the well 3.

The first temperature setting device 20 is, in particular directly, arranged on the lid device 5. As the lid extension 8 extends from the lid part 7 towards the well carrier 23 at least the part of the lid extension 8 being arranged in the well 3 has a different temperature than the lid part 7 when the first temperature setting device 20 heats the lid 6. The lid 6 heats gas arranged in the space 14. The first temperature setting device 20 can be a heating plate that covers the lid 6. As the further lid 13 is connected with the lid 6, the further lid 13 is also heated when the lid 6 is heated by the temperature setting device. In said case the further lid 13, in particular the extension tube 15, also heats the vaporized liquid of the liquid sample 2 and thus increases the temperature difference between the lid extension 8 and the vaporized liquid of the liquid sample.

The image acquisition system 1 comprises a second temperature setting device 22. The second temperature setting device 22 is used to heat the well carrier 3, in particular the liquid samples 2 arranged in the wells 3. The well carrier 3 is arranged on the second temperature setting device 22. In particular, the well carrier 23 is placed on the second temperature setting device 22. The second temperature setting device 22 can be a heating plate. The first temperature setting device 20 and the second temperature setting device 22 can be arranged opposite to each other with regard to the well carrier 23. The second temperature setting device 22 can heat the well carrier 23 and, thus, the liquid sample 2 and the vaporized liquid sample arranged in the well carrier 23.

The image acquisition system 1 comprises a control unit 19 for controlling the first temperature setting device 20 and the second temperature setting device 22. Alternatively, the first temperature setting device 20 and the second temperature device 22 can be controlled by non-shown different control units 19. The control unit 19 can control the first temperature setting device 20 and the second temperature device 22 such that the lid device 5 and/or the well carrier 23 reach a predetermined temperature. The lid device 5 comprises non-shown temperature sensors for measuring the temperature of the lid 6 and/or the further lid 13 and/or the well carrier 23 and/or the liquid sample 2. The control unit 19 controls the first and/or second temperature setting devices 20, 22 based on the measured temperatures values.

Additionally, the control unit 19 can control the pressure control device 18. Alternatively, the pressure control device 18 can be controlled by a different control unit. The control unit is electrically or electronically connected with the first temperature setting device 20 and the second temperature setting device 22. Additionally, the control unit is electrically or electronically connected with the pressure control device 18. The electrical connections are shown in dotted lines in FIG. 8 whereas the lid extension 8 shown in FIG. 8 has a rectangular shape.

Figure 9:
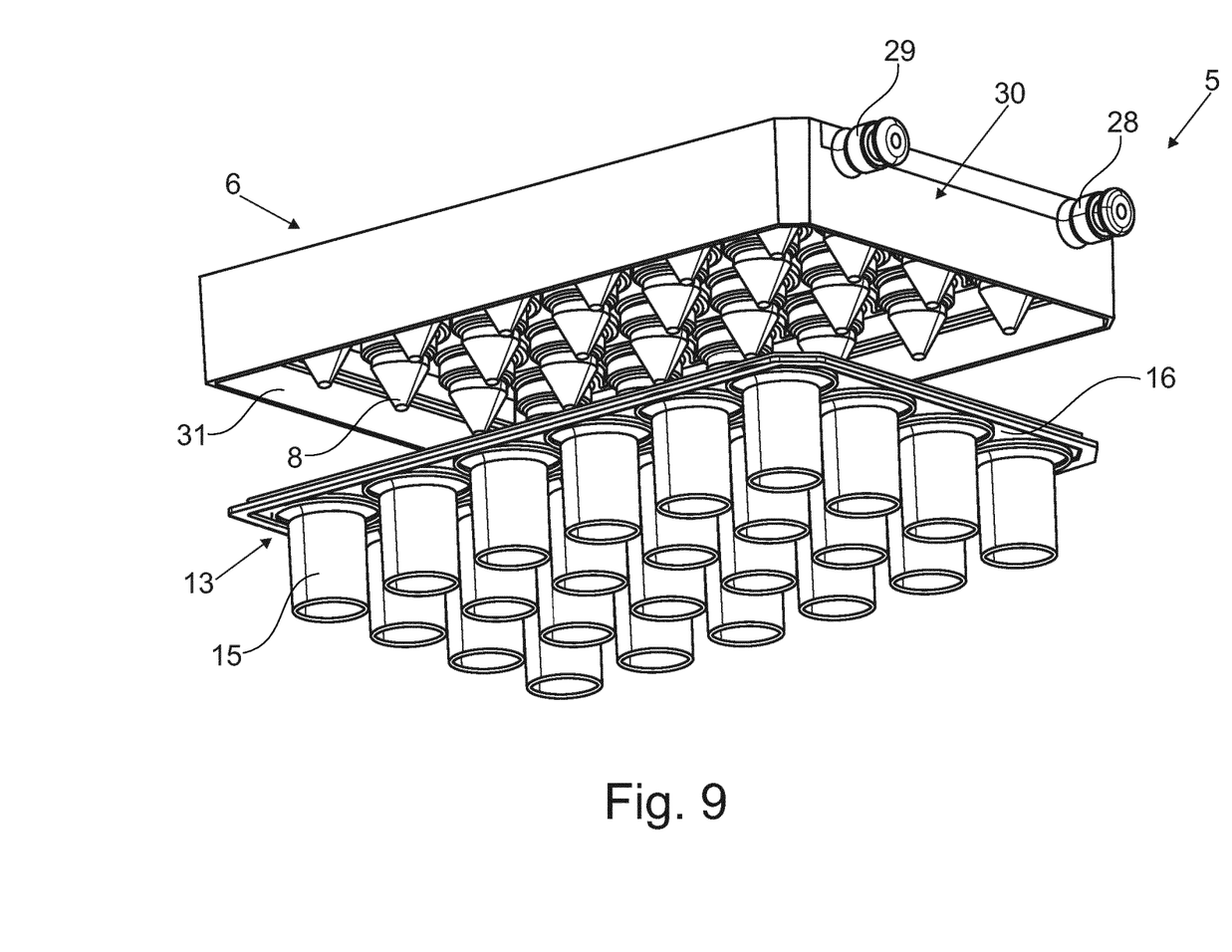
FIG. 9: an explosion view of an image acquisition system according to a sixth embodiment.

FIG. 9 shows an explosion view of an image acquisition system according to a sixth embodiment. The lid device 5 differs from the lid device 5 shown in FIG. 1 in the shape of the lid extension 8. In the embodiment shown in in FIG. 2 the lid extensions 8 have a tapered shape, respectively.

The lid device 5 comprises a further connection part 29. The further connection part 29 is used to fluidically connect the space 14 with a non-shown measurement device. The measurement device can be a pressure sensor. The pressure sensor measures the pressure within the space 14. Additionally or alternatively, the measurement device can be a temperature sensor for measuring the temperature of the lid 6. The connection part 28 and the further connection part 29 extend from the same lid side 30 in the same direction.

The lid 6 has a circumferential rim 31. The circumferential rim 31 delimits the space 14 in circumferential direction of the lid device 5. The circumferential rim 31 extends in the same direction as the lid extension 8.

The lid extensions 8 are arranged in a matrix structure. That means, there exists several rows and columns each having several lid extensions 8. The lid extensions 8 are arranged in distance adjacent to each other. The number and arrangement of the extension tubes 15 is identical to the number and arrangement of the lid extensions 8.

Figure 10:
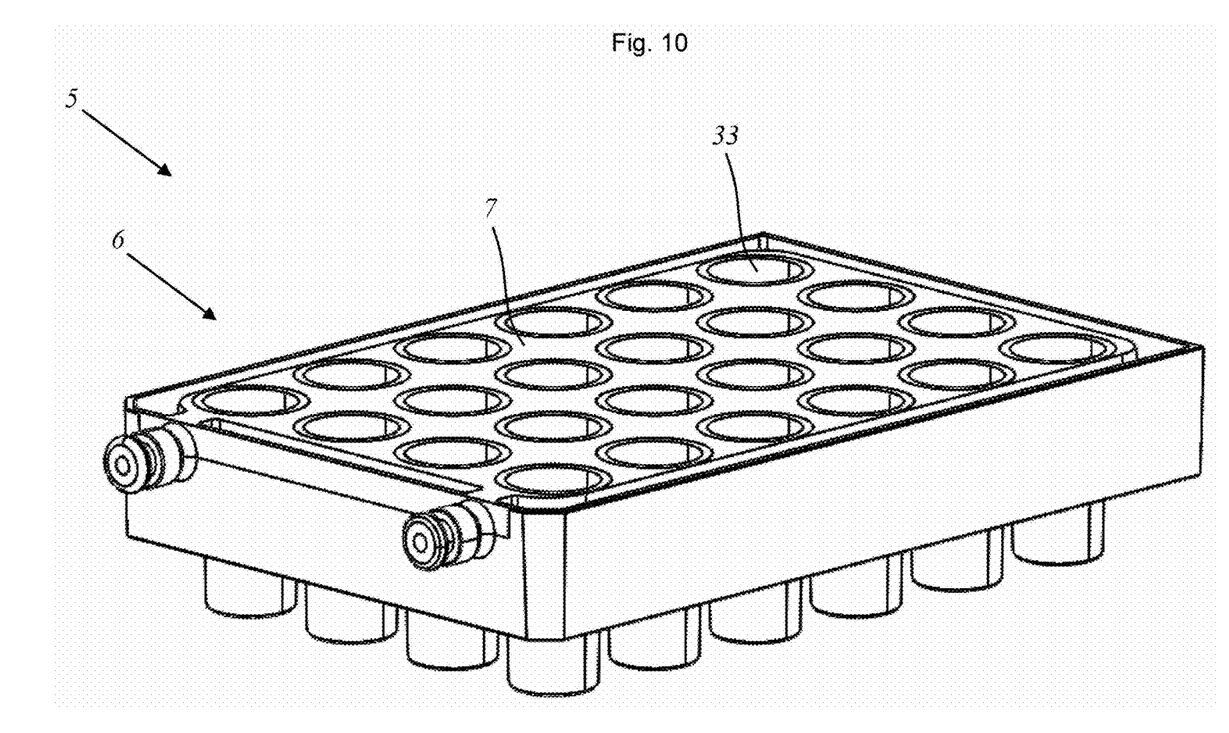
FIG. 10: a perspective view of the image acquisition system according to the sixth embodiment.

FIG. 10 shows a perspective view of the image acquisition system according to the sixth embodiment. Said FIG. 10 shows that the lid extensions 8 can be formed by deep drawing the lid 6. Thus, there exist recesses 33 in the locations where the lid extensions 8 are arranged.

Figure 11:
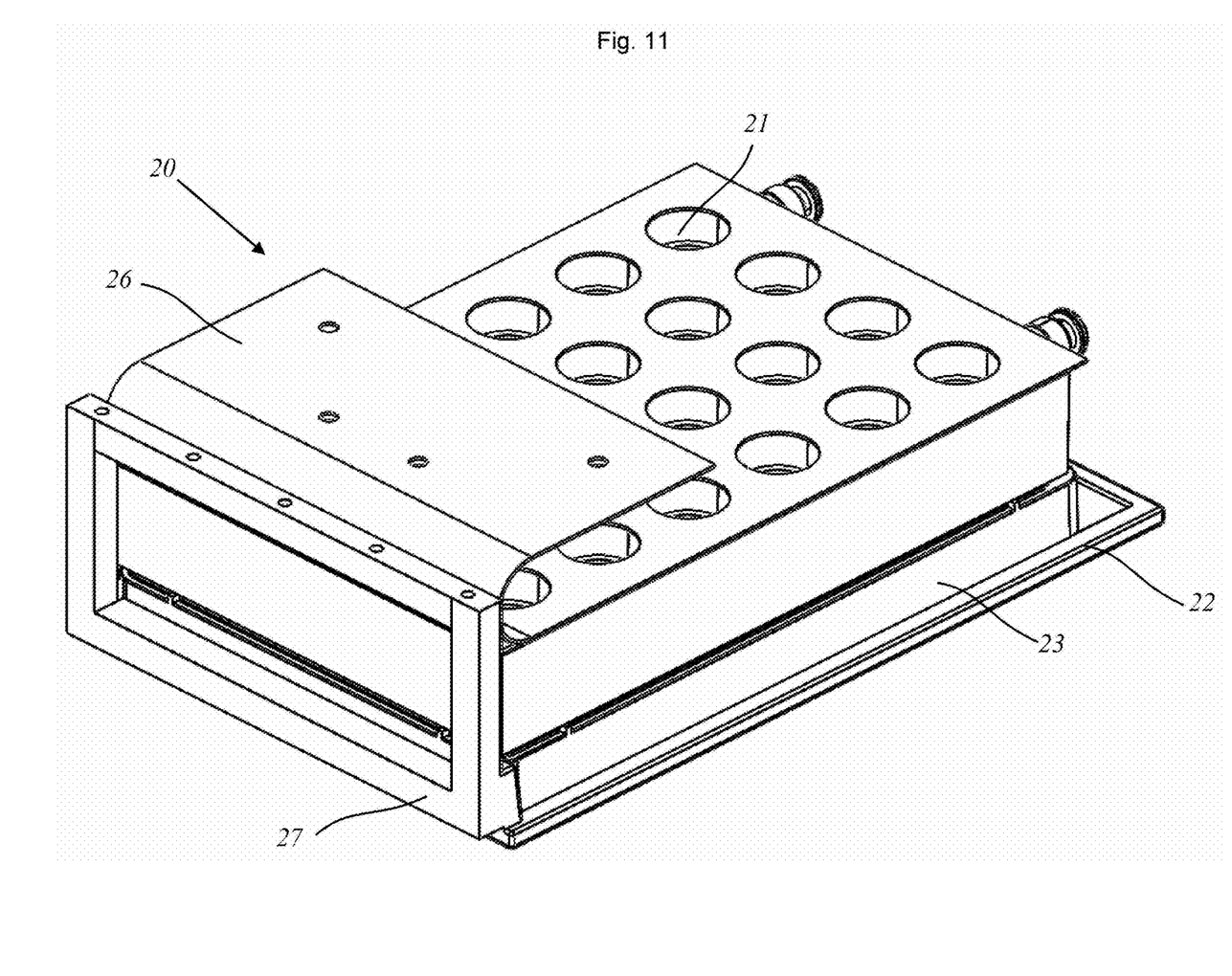
FIG. 11: a perspective view of the image acquisition system according to the sixth embodiment comprising a first and second temperature setting device.
Figure 12:
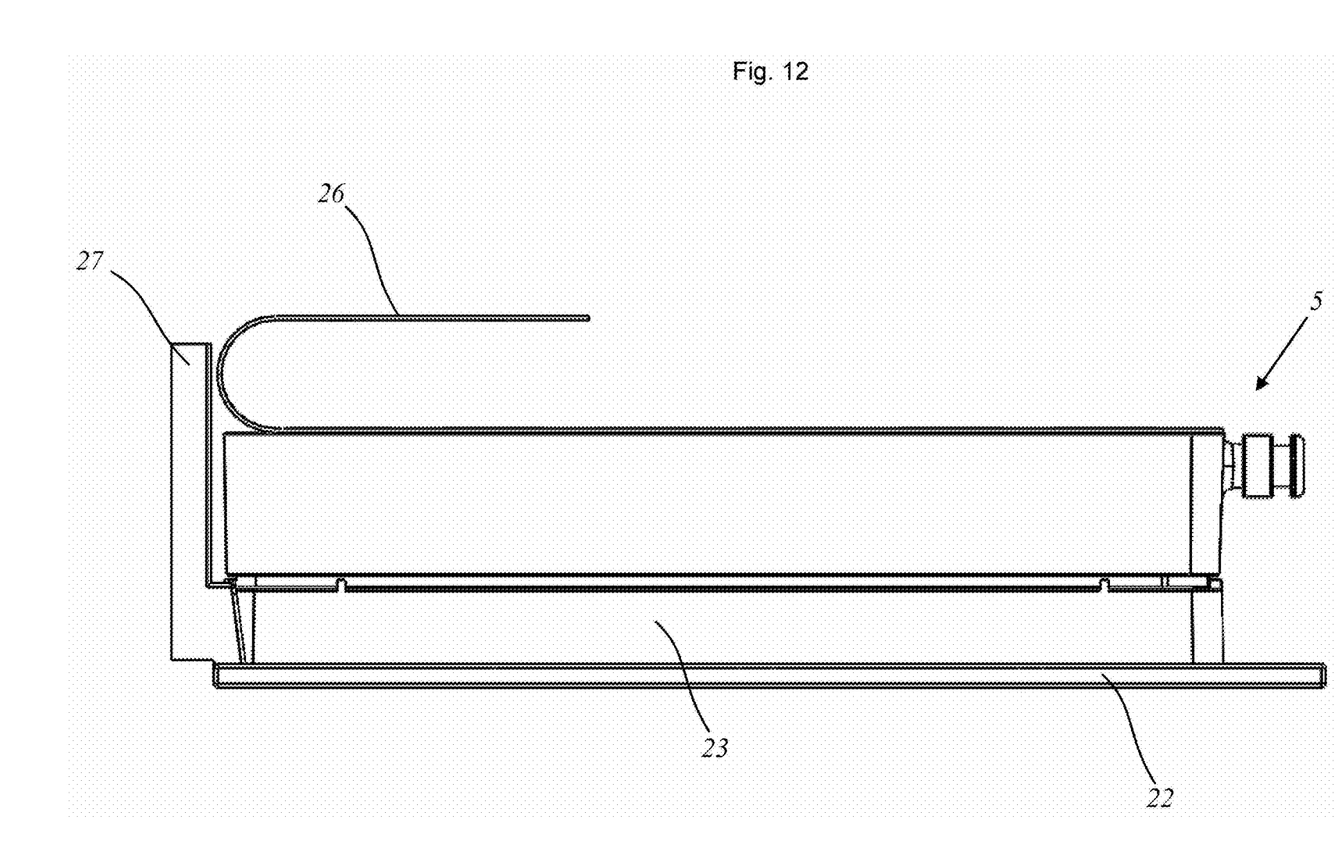
FIG. 12: a side view of the image acquisition system shown in FIG. 11.

FIG. 11 shows a perspective view of image acquisition system 1 and FIG. 12 shows a side view of the image acquisition system shown in FIG. 11. The first temperature setting device 20 is formed as heating plate and attached to the lid device 5. The first temperature setting device 20 has through holes 21 in the area where the bottom part 11 of the lid extension 8 is arranged. Thus, the heating plate does not cover the bottom part 11. The first temperature setting device 20 comprises a connection portion 26 by means of which it can be connected to other non-shown components of the image acquisition system 1. The lid device 5 is placed on the well carrier 23. The well carrier 23 is arranged on the second temperature setting device 22. The second temperature setting device 22 has an extension 27 that extends in a vertical direction. The extension 27 simplifies the movement of the lid device 5 and the well carrier 23. The second temperature setting device 22 has also non-shown through holes so that the image acquisition device can take an image of the liquid sample 2.

REFERENCE SIGNS

1 Image acquisition system
2 Liquid sample
3 Well
4 Image acquisition device
5 Lid device
6 Lid
7 Lid part
8 Lid extension
9 Illumination device
10 Well bottom
11 Bottom part of the lid extension
12 Sensor
13 Further lid
14 Space
15 Extension tube
16 Further lid part
18 Pressure control device
19 Control unit
20 first temperature setting device
21 through hole
22 second temperature setting device 23 well carrier
24 light beam
25 inner space
26 connection portion
27 extension
28 connection part
29 further connection part
30 lid side
31 circumferential rim
32 liquid drop
33 recess

The invention claimed is:

1. An image acquisition system for acquiring an image of a liquid sample, comprising:
   a well that stores the liquid sample;
   a camera configured to acquire an image of the liquid sample in the well; and
   a lid device configured to cover the well, wherein the lid device comprises a lid having a lid part and a lid extension that extends from the lid part into the well;
   wherein at least one part of the lid extension is in physical contact with the liquid sample when an image is acquired by the camera and the part of the lid extension that is in physical contact with the liquid sample is arranged such that a light beam passes through the part of the lid extension before it is received by the camera, wherein the lid device comprises a further lid that is connected with the lid such that a space exists between the lid and the further lid.

2. The image acquisition system according to claim 1, wherein the image acquisition system comprises an illumination device configured to provide the light beam.

3. The image acquisition system according to claim 2, wherein:
   a. the camera and the illumination device are arranged opposite to each other; or b. the camera and the illumination device are arranged on the same side of the image acquisition system.

4. The image acquisition system according to claim 1, wherein:
   a. the camera is arranged at a predetermined distance from a well bottom; and/or
   b. the camera is arranged at a predetermined distance from the part of the lid extension that is in physical contact with the liquid sample; and/or
   c. the lid part and the lid extension are formed in one piece; and/or
   d. the lid extension is formed by deep drawing the lid.

5. The image acquisition system according to claim 1, wherein the part of the lid extension is a bottom part of the lid extension.

6. The image acquisition system according to claim 5, wherein:
   a. the bottom part forms a closed end of the lid extension; and/or
   b. the bottom part is arranged closer to a well bottom than remaining parts of the lid; and/or
   c. the bottom part is transparent and/or light transmissive; and/or
   d. the bottom part and the remaining lid extension are formed in one piece.

7. The image acquisition system according to claim 1, wherein the image acquisition system comprises a plurality of lid devices, wherein the lid devices differ in a length of the lid extension from each other.

8. The image acquisition system according to claim 1, wherein the lid device comprises a plurality of lid extensions.

9. The image acquisition system according to claim 8, wherein:
   a. the plurality of lid extensions extends from the lid part; and/or
   b. the number of lid extensions corresponds to the number of wells.

10. The image acquisition system according to claim 1, wherein the image acquisition system is configured to move the well.

11. The image acquisition system according to claim 1, wherein the image acquisition system comprises a sensor for sensing whether the lid extension is in physical contact with the liquid sample.

12. The image acquisition system according to claim 11, wherein:
    a. the sensor is arranged on the lid extension; and/or
    b. the sensor is configured to send a sensor signal to one or more controllers when the sensor is in contact with the liquid sample.

13. The image acquisition system according to claim 1, wherein the further lid comprises an extension tube that extends from a further lid part of the further lid.

14. The image acquisition system according to claim 13, wherein:
    a. the extension tube surrounds a part of the lid extension; and/or
    b. the extension tube protrudes longer to the well than the lid extension; and/or
    c. the extension tube has an open end; and/or
    d. the extension tube and the further lid part are formed in one piece; and/or
    e. a plurality of extension tubes extend from the further lid part; and/or
    f. a number of extension tubes corresponds with a number of wells.

15. The image acquisition system according to claim 1, wherein the image acquisition system comprises a pressure control device, wherein:
    a. the pressure control device controls a pressure in the space; and/or
    b. the pressure control device is fluidically connected with the well by the space.

16. The image acquisition system according to claim 15, wherein a negative pressure is created in the space before an image is acquired.

17. The image acquisition system according to claim 1, wherein the image acquisition system comprises one or more controllers.

18. The image acquisition system according to claim 17, wherein:
    a. the one or more controllers are configured to check whether at least one part of the lid extension is in physical contact with liquid sample; and/or
    b. the one or more controllers are configured to check whether a sensor measures that the part of the lid extension is in physical contact with liquid sample; and/or
    c. the one or more controllers determines a negative pressure and acts to apply negative pressure in the space; and/or
    d. the one or more controllers are configured to act on the camera to acquire an image after or during movement of the well; and/or e. the one or more controllers are configured to control processing of the liquid sample in the well; and/or f. the one or more controllers are configured to act on the camera to acquire an image after processing of the liquid sample is finished or during the processing of the liquid sample.

19. The image acquisition system according to claim 1, wherein the camera comprises at least one temperature setting device.

20. The image acquisition system according to claim 19, wherein:

a. the image acquisition system comprises a first temperature setting device configured to heat or cool the lid part; or b. the image acquisition system comprises a first temperature setting device configured to heat or cool the lid part, wherein the first temperature setting device comprises at least one through hole; and/or c. the image acquisition system comprises a second temperature setting device configured to heat or cool the well; or d. the image acquisition system comprises a second temperature setting device configured to heat or cool the well and the well is arranged on the second temperature setting device.

* * * * *